(12) United States Patent
Prusty et al.

(10) Patent No.: US 9,206,315 B2
(45) Date of Patent: Dec. 8, 2015

(54) ARTICLE COMPRISING THERMOPLASTIC POLYURETHANE AND POLYAMIDE 6/66 COPOLYMER

(75) Inventors: Manoranjan Prusty, Mannheim (DE); Axel Wilms, Frankenthal (DE); Eric S. Noon, Flat Rock, MI (US); Walter Gotz, Obersulzen (DE); Gulay Serhatkulu, Grosse Ile, MI (US); Elke Marten, Ostercappeln (DE)

(73) Assignee: BASF SE, Ludwigshafen (DE)

( * ) Notice: Subject to any disclaimer, the term of this patent is extended or adjusted under 35 U.S.C. 154(b) by 660 days.

(21) Appl. No.: 13/142,979

(22) PCT Filed: Dec. 16, 2009

(86) PCT No.: PCT/EP2009/067311
§ 371 (c)(1),
(2), (4) Date: Nov. 16, 2011

(87) PCT Pub. No.: WO2010/076225
PCT Pub. Date: Jul. 8, 2010

(65) Prior Publication Data
US 2012/0055576 A1  Mar. 8, 2012

Related U.S. Application Data

(60) Provisional application No. 61/141,901, filed on Dec. 31, 2008, provisional application No. 61/141,911, filed on Dec. 31, 2008.

(51) Int. Cl.
*B32B 1/08* (2006.01)
*C08L 77/02* (2006.01)
(Continued)

(52) U.S. Cl.
CPC ............. *C08L 77/02* (2013.01); *B29C 47/0021* (2013.01); *B29C 47/0023* (2013.01);
(Continued)

(58) Field of Classification Search
CPC ....... Y10T 428/1397; B32B 1/08; F16L 9/12; F16L 11/06; F16L 57/02; F16L 58/10
USPC .......... 428/34.1, 34.2, 35.7, 35.9, 36.9, 36.92
See application file for complete search history.

(56) References Cited

U.S. PATENT DOCUMENTS 3,903,351 A  9/1975  Ando et al.
5,135,805 A  8/1992  Sellers et al.
(Continued)

FOREIGN PATENT DOCUMENTS

CA  2483333 A1  4/2005
CN  1605668 A  4/2005
(Continued)

OTHER PUBLICATIONS

No English language abstract found for DE 4124892; however, see English language equivalent U.S. Pat. No. 5,135,805. Original document extracted from the espacenet.com database on Mar. 6, 2012, 7 pages.
(Continued)

*Primary Examiner* — Marc Patterson
(74) *Attorney, Agent, or Firm* — Howard & Howard Attorneys PLLC

(57) ABSTRACT

The instant invention includes an article and a method of forming the article. The article includes a mixture of a thermoplastic polyurethane and polyamide 6/66 copolymer. The thermoplastic polyurethane has a Shore Hardness of at least 36D as determined using DIN EN ISO 1183-1.

19 Claims, 4 Drawing Sheets

(51) Int. Cl.

| | | |
|---|---|---|
| *B29C 47/00* | (2006.01) | |
| *B29C 47/06* | (2006.01) | |
| *B29C 47/14* | (2006.01) | |
| *B29C 47/26* | (2006.01) | |
| *C08L 75/04* | (2006.01) | |
| *C08L 77/00* | (2006.01) | |
| *C08L 77/06* | (2006.01) | |
| *F16L 9/12* | (2006.01) | |
| *F16L 11/06* | (2006.01) | |
| *F16L 57/02* | (2006.01) | |
| *F16L 57/06* | (2006.01) | |
| *F16L 58/10* | (2006.01) | |
| *B32B 1/02* | (2006.01) | |
| *B29C 47/02* | (2006.01) | |
| *B29K 75/00* | (2006.01) | |
| *B29K 77/00* | (2006.01) | |
| *B29L 23/00* | (2006.01) | |

(52) U.S. Cl.
CPC .......... *B29C 47/0026* (2013.01); *B29C 47/065* (2013.01); *B29C 47/145* (2013.01); *B29C 47/26* (2013.01); *C08L 75/04* (2013.01); *C08L 77/00* (2013.01); *C08L 77/06* (2013.01); *F16L 9/12* (2013.01); *F16L 11/06* (2013.01); *F16L 57/02* (2013.01); *F16L 57/06* (2013.01); *F16L 58/10* (2013.01); *B29C 47/003* (2013.01); *B29C 47/0054* (2013.01); *B29C 47/02* (2013.01); *B29K 2075/00* (2013.01); *B29K 2077/00* (2013.01); *B29K 2995/0072* (2013.01); *B29L 2023/22* (2013.01)

(56) References Cited

U.S. PATENT DOCUMENTS

| | | | |
|---|---|---|---|
| 5,585,152 A | 12/1996 | Tamura et al. | |
| 6,133,466 A | 10/2000 | Edelmann et al. | |
| 6,142,189 A | 11/2000 | Bhattacharyya | |
| 6,312,824 B1 * | 11/2001 | Philippoz et al. | 428/480 |
| 6,491,994 B1 | 12/2002 | Kito et al. | |
| 6,807,988 B2 | 10/2004 | Powell et al. | |
| 7,281,547 B2 | 10/2007 | Cleveland et al. | |
| 7,579,058 B2 | 8/2009 | Dowe et al. | |
| 2002/0100516 A1 | 8/2002 | Powell et al. | |
| 2005/0227786 A1 | 10/2005 | Sullivan et al. | |
| 2006/0127620 A1 | 6/2006 | Fisher | |
| 2006/0149000 A1 * | 7/2006 | Ikuta et al. | 525/343 |

FOREIGN PATENT DOCUMENTS

| | | |
|---|---|---|
| CN | 101067467 A | 11/2007 |
| DE | 4124892 A1 | 3/1992 |
| DE | 102006036539 A1 | 2/2008 |
| EP | 0657505 A1 | 6/1995 |
| EP | 0978525 A2 | 2/2000 |
| GB | 2347933 A | 9/2000 |
| JP | 2005-219000 | 8/2005 |

OTHER PUBLICATIONS

English language abstract for DE 102006036539 extracted from the espacenet.com database on Mar. 6, 2012, 18 pages.
English language abstract for EP 0978525 extracted from the espacenet.com database on Mar. 6, 2012, 10 pages.
English language abstract and translation for JP 2005-219000 extracted from the PAJ database, 28 pages.
International Search Report for Application No. PCT/EP2009/067311 dated Apr. 12, 2010, 3 pages.
English language abstract not available for CN 1605668; however, see English language equivalent CA 2483333. Original document extracted from the espacenet.com database on Jan. 28, 2014, 13 pages.
English language abstract for CN 101067467 extracted from the espacenet.com database on Jan. 28, 2014, 15 pages.
Cai Hui, "Development of Rubber Plastic Composite Soft Tubes Knitted with Steel Wires", China Rubber, No. 2/1997 (No. 290).

* cited by examiner

… (1)

ARTICLE COMPRISING THERMOPLASTIC POLYURETHANE AND POLYAMIDE 6/66 COPOLYMER

CROSS-REFERENCE TO RELATED APPLICATIONS

The subject patent application claims priority to, and all the benefits of PCT International Patent Application Ser. No. PCT/EP2009/067311, filed on Dec. 16, 2009, U.S. Provisional Patent Application Ser. Nos. 61/141,901 and 61/141,911, each of which was filed on Dec. 31, 2008. The entirety of these provisional patent applications is expressly incorporated herein by reference.

FIELD OF THE INVENTION

The present invention generally relates to an article that includes a mixture of a particular thermoplastic polyurethane and polyamide 6/66 copolymer. More specifically, the present invention relates to an article which is a single layer tube that has an inner surface that defines a path for conveying a flowable composition.

DESCRIPTION OF THE RELATED ART

It is well known in the art that high performance articles, such as films, molded parts, tubes, and hoses, are typically formed from single or multiple layers of polymers which provide rigidity, strength, structural resilience, and both chemical and temperature resistance. The multiple layers of polymers are typically formed from compounded elastomers such as chlorinated polyethylenes, chlorosulfonated polyethylenes, and similar materials that are capable of withstanding high temperatures and pressure and that are resistant to chemical degradation, such as from automotive fluids. However, use of these compounded elastomers is expensive and usually requires specialized equipment, vulcanization, and numerous processing steps which extends production times and increases manufacturing complexities. In addition, the multiple layers of polymers have a tendency to increase the size and density of the articles thereby limiting the usefulness of the articles in many applications.

Thermoplastic polyurethanes (TPUs) are also known in the art as being used in the formation of high performance articles. Relative to high performance hoses, the TPUs are typically used to form multiple exterior support layers which provide support and structural strength to the hoses. However, like the compounded elastomers described above, the TPUs are heavy and increase the bulk and density of the articles, thereby reducing desirability in many applications. In addition, TPUs are known to fragment or burst at low pressures thereby further reducing their application and desirability.

In addition, polyamides are also used in high performance articles but are typically not suitable for use in sub-zero temperature environments. Due to their crystallinity, polyamides are traditionally very difficult to form to form into specialized articles, such as tubes and hoses, and require special processing techniques for commercial use such as the use of compatibilizers. The use of compatibilizers is expensive and typically requires additional review by the Food and Drug Administration (FDA) when the articles are used in medical or sterile applications. In addition, although polyamides can withstand high pressures before fragmenting or bursting, they cannot be easily used in automotive or other applications where flexibility is required. Upon bending, polyamides tend to kink, thereby reducing the performance of the articles.

Accordingly, there remains an opportunity to develop an improved article that is resistant to temperature fluctuations and chemicals and that can be used in a variety of environments and applications.

SUMMARY OF THE INVENTION AND ADVANTAGES

The instant invention provides a single layer tube having an inner surface that defines a path for conveying a flowable composition. The single layer tube includes a mixture of a thermoplastic polyurethane and polyamide 6/66 copolymer. The thermoplastic polyurethane has a Shore Hardness of at least 36D as determined using DIN EN ISO 1183-1. The instant invention also provides a tube assembly that includes the single layer tube and a sheath disposed on the single layer tube. The sheath includes a polymer that is the same or different than the thermoplastic polyurethane.

The single layer tube and tube assembly of this invention exhibit excellent resistance to pressure (i.e., burst strength), excellent chemical and heat resistance, and a resistance to kinking. The TPU and the polyamide 6/66 copolymer provide the single layer tube and tube assembly with toughness, low temperature flexibility, tensile strength, tear strength, abrasion resistance, transparency, resistance to oils, resistance to hydrolysis, and hardness without brittleness.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The instant invention provides an article (10) that includes a mixture of a thermoplastic polyurethane (TPU) having a Shore Hardness of at least 36D as determined using DIN EN ISO 1183-1 and a polyamide 6/66 copolymer. The instant invention also provides a method of forming the article (10). The TPU, the polyamide 6/66 copolymer, and the method are described in greater detail below.

Referring specifically to the article (10) of this invention, the article (10) is not limited to any one particular embodiment and can be further defined as any type of article (10) that includes the mixture of the TPU having the Shore Hardness of at least 36D as determined using DIN EN ISO 1183-1 and the polyamide 6/66 copolymer. However, the article (10) is typically further defined as a wheel, a caster tire, a hose jacket, a wire and cable jacket, a tube, a hose, a conveyor belt, a coating, a mechanical good, a sporting good such as a ski-boot, an appliance, furniture, an animal tag, a golf ball and/or disc cover, hydraulic or pneumatic equipment, medical equipment, automobile equipment, road safety equipment, or railroad pads and insulators.

Figure 7:
FIG. 7 is a cross-sectional view of a single layer film including a mixture of a TPU having a Shore Hardness of at least 36D as determined using DIN EN ISO 1183-1 and a polyamide 6/66 copolymer.
Figure 8:
FIG. 8 is a cross-sectional view of a two layer film wherein a first layer includes a mixture of the TPU and the polyamide 6/66 copolymer and is disposed on a second layer.
Figure 9:
FIG. 9 is a cross-sectional view of a three layer film wherein a first layer and a third layer each include the mixture of the TPU and the polyamide 6/66 copolymer and the first and third layers sandwich a second layer.
Figure 10:
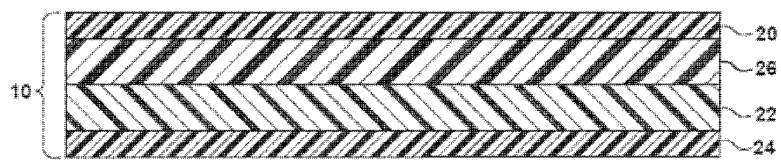
FIG. 10 is a cross-sectional view of the film of FIG. 9 further including a fourth layer wherein the first and third layers sandwich the second and fourth layers.
Figure 11:
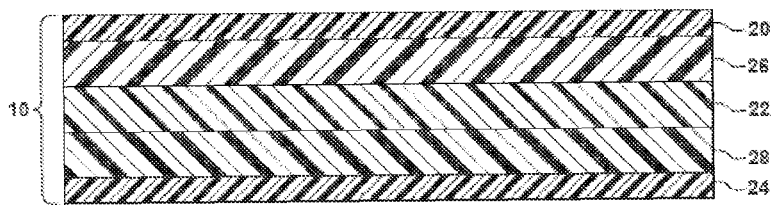
FIG. 11 is a cross-sectional view of the film of FIG. 10 further including a fifth layer wherein the first and third layers sandwich the second, fourth, and fifth layers.

In one embodiment, the article (10) is further defined as a sheet or film, as shown in FIGS. 7-11. The film can have an infinite length and/or width and may be disposed on a roll. Typically, the film is rectangular and has a length greater than a width. Alternatively, the film may have a width greater than a length. Still further, the film can be square. The film can be used in industrial production of a wide variety of packages to seal contents of the packages and protect the contents from dust, moisture, and the like. Alternatively, the film can be used in residential and consumer applications including, but not limited to, food storage and preservation, package wrapping, and the like. In one embodiment, as shown in FIG. 7, the film is a single layer (12) (also referred to herein as a first layer) including the mixture of the TPU and the polyamide 6/66 copolymer. In another embodiment, as shown in FIG. 8, the film includes the first layer (20) disposed on a second layer (22). In yet another embodiment, as set forth in FIG. 9, the film includes a third layer (24) that is the same as the first layer (20). In this embodiment, the first layer (20) and the third layer (24) sandwich the second layer (22). In yet another embodiment, as set forth in FIG. 10, the film includes a fourth layer (26). In this embodiment, the first layer (20) and the third layer (24) sandwich both the second layer (22) and the fourth layer (26). In still a further embodiment, as set forth in FIG. 11, the film includes a fifth layer (28). In this embodiment, the first layer (20) and the third layer (24) sandwich the second layer (22), the fourth layer (26), and the fifth layer (28). It is also contemplated that the film can include more than five layers. In one embodiment, the film is further defined as having seven layers (not shown in the Figures). Of course, it is to be understood that the various layers can be arranged in any order and the article (10) is not limited to the aforementioned embodiments. The layers of these embodiments are not particularly defined or limited except that the article, e.g. at least one of the layers, must include a mixture of the TPU and the polyamide 6/66 copolymer. In various embodiments, one or more of the layers is selected from the group of a metal, a plastic, a polymer, a polyurethane, a paper, a textile, a silicone, and combinations thereof.

The film, including any or all of the aforementioned layers, typically has a thickness of from 1 mil to 100 mils. Typically, the first layer (20) has a thickness of from 0.5 to 12, more typically of from 1 to 8, and most typically of from 1 to 6, mils. In some embodiments, the thickness of the first layer (20) contributes to both a light transmission and a haze of the film. A high light transmission and a low haze are generally desirable. In addition, the second through fifth layers typically have thicknesses of from 0.5 to 100, more typically of from 0.5 to 12, and most typically of from 1 to 8, mils.

Figure 12:
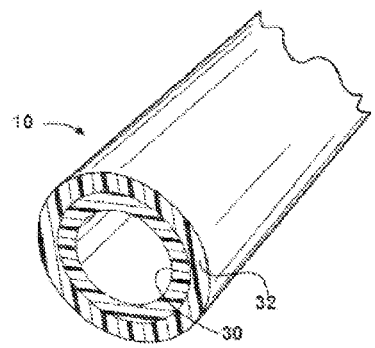
FIG. 12 is a cross-sectional view of a two layer tube including an interior layer and an exterior layer that is disposed on the interior layer and that includes the mixture of the TPU and the polyamide 6/66 copolymer.

In an additional embodiment, such as in FIG. 12, the article (10) is further defined as a two layer tube or hose. The tube includes an inner layer (30) and an outer layer (32) that is disposed on the inner layer (30). The inner layer (30) typically includes a polymer, which may be any known in the art. The outer layer (32) typically includes the mixture of the TPU and the polyamide 6/66 copolymer.

Figure 13:
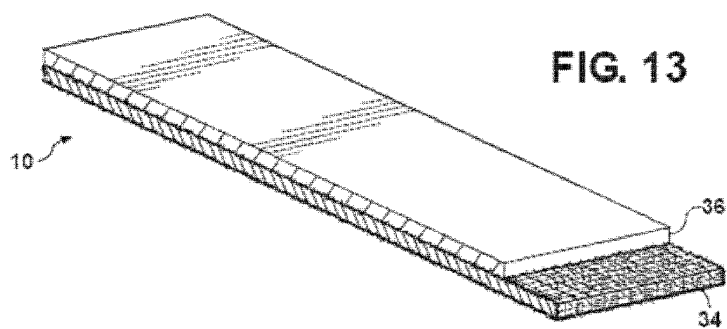
FIG. 13 is a side cross-sectional view of a base layer that includes the mixture of the TPU and the polyamide 6/66 copolymer and a textile layer that is disposed on the base layer.

In an alternative embodiment, as set forth in FIG. 13, the article (10) includes a base layer (36) and a textile layer (34) disposed on the base layer (36). The base layer (36) includes the mixture of the TPU and the polyamide 6/66 copolymer. The textile layer (34) may be woven or non-woven or may include both woven and non-woven segments. As is known in the art, woven textiles are typically cloths that are formed by weaving and that stretch in bias directions. As is also known in the art, non-woven textiles are neither woven nor knit and are typically manufactured by putting individual fibers together in the form of a sheet or web, and then binding them either mechanically, with an adhesive, or thermally by melting a binder onto the textile. Non-woven textiles typically include staple non-woven textiles and spunlaid non-woven textiles. Staple non-woven textiles are typically made by spinning fibers that are spread in a uniform web and then bonded by using either resin or heat. Spunlaid non-woven textiles are typically made in one continuous process by spinning fibers directly disposed into a web. The spunlaid process can be combined with a meltblowing process to form a SMS (spun-melt-spun) non-woven textile. Non-woven textiles also include films and fibrillates and can be formed using serration or vacuum-forming to form patterned holes. Typical woven and non-woven textiles include, but are not limited to, animal textiles, plant textiles, mineral textiles, synthetic textiles, and combinations thereof.

Figure 14:
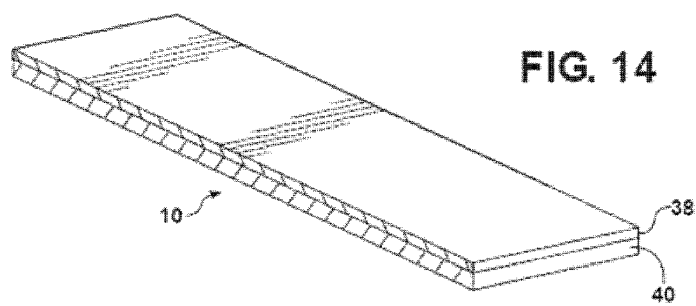
FIG. 14 is a side cross-sectional view of an insulating layer and a capping layer disposed thereon and including the mixture of the TPU and the polyamide 6/66 copolymer.

In yet another embodiment, as set forth in FIG. 14, the article (10) is further defined as a railroad rail and includes an insulating layer (38) and a capping layer (40) disposed on the insulating layer (38). The insulating layer (38) typically includes a polyamide or polyamide copolymer, which may be any known in the art. The capping layer (40) includes the mixture of the TPU and the polyamide 6/66 copolymer.

In still other embodiments, the article (10) is a single layer, includes two layers, or includes a plurality of layers, but is not a film. Alternatively, the article (10) can include a combination of two or more of the aforementioned layers which can be disposed in direct contact with each other or can be physically separated from each other within the article (10).

One or more of the aforementioned layers of the article (10) typically includes the mixture of the TPU and the polyamide 6/66 copolymer. Furthermore, any or all of the aforementioned layers may consist essentially of the mixture of the TPU and the polyamide 6/66 copolymer and include less than 0.1, 0.01, or 0.001 parts by weight of any other polymer per 100 parts by weight of the mixture. Alternatively, any or all of the aforementioned layers (12-32) may consist of the mixture of the TPU and the polyamide 6/66 copolymer. Moreover, the article (10) can be free of one or more of the aforementioned layers and still include, consist essentially of, or consist of, the mixture of the TPU and the polyamide 6/66 copolymer.

It is also contemplated that the article (10) may include a substrate and a layer comprising the mixture that is disposed on the substrate. The substrate is not particularly limited and may be any substrate in the art. The substrate may include, but is not limited to, a metal, a plastic, a polymer, a polyurethane, a paper, a textile, a silicone, and combinations thereof.

In various embodiments, the article (10) is further defined as a single layer tube (11), as shown in FIGS. 1, 3, 5, and 6. The single layer tube (11) may be further defined as a single layer hose, single layer pipe, single layer jacket, or the like. The single layer tube (11) may have any shape or dimensions, may be flexible, semi-flexible, or rigid. In one embodiment, the single layer tube (11) includes sections that are flexible and sections that are rigid. The single layer tube (11) may be further defined as a single layer garden tube for domestic use, a single layer agricultural tube (e.g. a "tough" single layer tube), a single layer fire tube, a single layer pneumatic tube, a single layer cooling, lubrication, and/or hydraulic tube, a single layer airbrake tube, a single layer vacuum tube, a single layer heating, cooling, brake, and/or locking system tube, a single layer sterile tube, a single layer fuel line, and combinations thereof.

Figure 1:
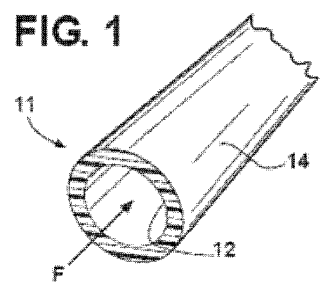
FIG. 1 is an end view of a single layer tube having circumferential inner and outer surfaces.
Figure 3:
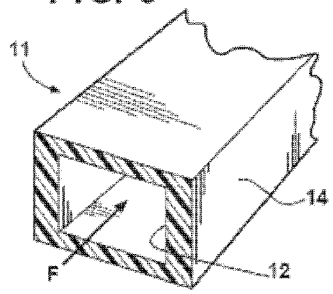
FIG. 3 is an end view of a single layer tube having rectangular inner and outer surfaces.
Figure 5:
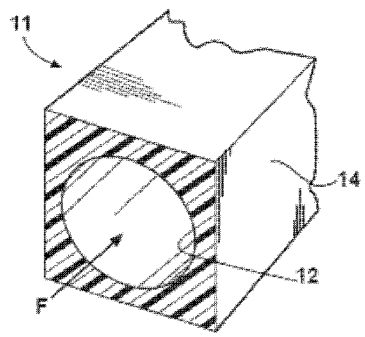
FIG. 5 is an end view of a single layer tube having a circumferential inner surface and a rectangular outer surface.
Figure 6:
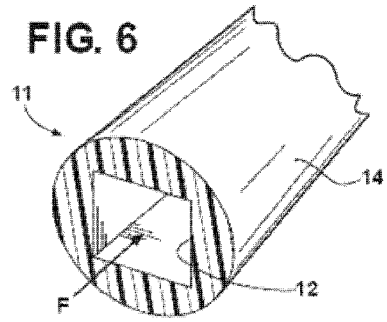
FIG. 6 is an end view of a single layer tube having a rectangular inner surface and a circumferential outer surface.

The single layer tube (11) has an inner surface (12) that may be any shape. In various embodiments, the inner surface (12) is circumferential, as shown in FIGS. 1 and 5. In other embodiments, the inner surface (12) is rectangular, as shown in FIGS. 3 and 6. In a further embodiment, the inner surface (12) is square. The inner surface (12) may be smooth, rough, or may include smooth and rough sections. In one embodiment, the inner surface (12) is corrugated or ribbed. The single layer tube (11) also has an outer surface (14). The outer surface (14) may also be of any shape and typically is circumferential, square, or rectangular. In various embodiments, as shown in FIGS. 3 and 5, the outer surface (14) is rectangular.

In still further embodiments, the inner surface (12) of the single layer tube (11) is circumferential and typically has a diameter of from 1 to 20, more typically of from 3 to 18, still more typically of from 5 to 10, and most typically of from 5 to 8, mm. In additional embodiments, the outer surface (14) of the single layer tube (11) is circumferential and typically has a diameter of from 1 to 40, more typically of from 3 to 30, still more typically of from 5 to 20, even more typically of from 5 to 15, and most typically of from 8 to 12, mm. In one embodiment, the inner surface (12) of the single layer tube (11) is circumferential and has a diameter of approximately 8 mm. In another embodiment, the inner surface (12) of the single layer tube (11) is circumferential and has a diameter of approximately 5.6 mm. In a further embodiment, the outer surface (14) of the single layer tube (11) is circumferential and has a diameter of approximately 12 mm. In still a further embodiment, the outer surface (14) of the single layer tube (11) is circumferential and has a diameter of approximately 8.2 mm.

The inner surface (12) of the single layer tube (11) defines a path (F) for conveying a flowable composition, as shown in the Figures. The inner surface (12) is typically in direct contact with the flowable composition. It is to be understood that the flowable composition itself is not required in the instant invention. In other words, the inner surface (12) is typically designed to be in contact with the flowable composition but need not actually be in such contact when the single layer tube (11) is formed. The flowable composition may be further defined as fluid, such as a liquid, a gas, or combinations thereof. In one embodiment, the fluid is a liquid. In another embodiment, the fluid is a gas. In a further embodiment, the fluid is further defined as air. In alternative embodiments, the fluid is defined as water or automotive fluids or combinations thereof. In still other embodiments, the flowable composition is further defined as a series of solid particles, e.g. granules. Of course, it is to be understood that the series of solid particles is not limited in size or shape so long as the particles are flowable through the single layer tube (11).

As described above, the single layer tube (11) includes a mixture of the thermoplastic polyurethane (TPU) and the polyamide 6/66 copolymer. It is well known in the art that TPUs are a class of plastics with many useful properties and can be used in many different processing methods including, but not limited to, extruded sheet and film methods, cast film methods, blown film methods, tubing methods, profile methods, cross-head extrusion methods, blow molding methods, calendaring methods, thermoforming methods, and combinations thereof.

TPUs typically include linear segmented block copolymers including hard and soft segments. Without intending to be bound by any particular theory, it is believed that the soft segments are of low polarity and form an elastomer matrix which provides elastic properties to the TPU. The hard segments are believed to be shorter than the soft segments, to be of higher polarity, and act as multifunctional tie points that function both as physical crosslinks and reinforcing fillers. The physical crosslinks are believed to disappear when heat is applied, thus allowing the TPUs to be used in the variety of processing methods described above.

The TPU of this invention has a Shore Hardness of at least 36D determined using DIN EN ISO 1183-1. Typically, softer TPUs are measured using a Shore A scale while harder TPUs are measured using a Shore D scale, as is known in the art. Thus, the TPU of this invention may have a reported Shore A hardness and remain suitable for use due to a corresponding Shore D hardness of at least 36D. In various embodiments, the TPU has a Shore Hardness of from 36D to 74D, from 40D to 74D, from 47D to 64D, or from 60D to 67D, determined using DIN EN ISO 1183-1. The TPU may be further defined as a polyether TPU, a polyester TPU, or a combination of a polyether TPU and a polyester TPU. That is, the TPU may be further defined as including the reaction product of an isocyanate and a polyether polyol, a polyester polyol, or a combination of a polyether polyol and a polyester polyol. Alternatively, the TPU may be further defined as a multi-block copolymer produced from a poly-addition reaction of an isocyanate with a linear polymeric glycol, low molecular weight diol, and or/polyol. Typically, TPUs having a Shore hardness of from about 60A to 80D can be obtained by varying a ratio of hard segments and soft segments, as described above. This Shore Hardness, along with modulus, load-bearing capacity (compressive stress), tear strength, and specific gravity, typically increases as a ratio of hard segments to soft segments increases.

In one embodiment, the TPU is a polyester TPU and includes the reaction product of a polyester polyol and an isocyanate component. Suitable polyester polyols are typically produced from a reaction of a dicarboxylic acid and a glycol having at least one primary hydroxyl group. Suitable dicarboxylic acids include, but are not limited to, adipic acid, methyl adipic acid, succinic acid, suberic acid, sebacic acid, oxalic acid, glutaric acid, pimelic acid, azelaic acid, phthalic acid, terephthalic acid, isophthalic acid, and combinations thereof. Glycols that are suitable for use in producing the polyester polyols include, but are not limited to, ethylene glycol, butylene glycol, hexanediol, bis(hydroxylmethylcyclohexane), 1,4-butanediol, diethylene glycol, 2,2-dimethyl propylene glycol, 1,3-propylene glycol, and combinations thereof.

In an alternative embodiment, the TPU is a polyester TPU and includes the reaction product of a suitable chain extender and an isocyanate component. Suitable chain extenders include, but are not limited to, diols including ethylene glycol, propylene glycol, butylene glycol, 1,4-butanediol, butenediol, butynediol, xylylene glycols, amylene glycols, 1,4-phenylene-bis-beta-hydroxy ethyl ether, 1,3-phenylene-bis-beta-hydroxy ethyl ether, bis-(hydroxy-methyl-cyclohexane), hexanediol, and thiodiglycol, diamines including ethylene diamine, propylene diamine, butylene diamine, hexamethylene diamine, cyclohexylene diamine, phenylene diamine, tolylene diamine, xylylene diamine, 3,3'-dichlorobenzidine, 3,3'- and dinitrobenzidine, alkanol amines including ethanol amine, aminopropyl alcohol, 2,2-dimethyl propanol amine, 3-aminocyclohexyl alcohol, and p-aminobenzyl alcohol, and combinations thereof. Specific examples of suitable polyester TPUs that may be used in this invention include, but are not limited to, Elastollan® 600, 800, B, C, and S Series polyester TPUs commercially available from BASF Corporation.

In a further embodiment, the TPU is a polyether TPU and includes the reaction product of a polyether polyol and an isocyanate component. Suitable polyether polyols include, but are not limited to, polytetramethylene glycol, polyethylene glycol, polypropylene glycol, and combinations thereof. In yet another embodiment, the TPU is a polyether TPU and includes the reaction product of a chain extender and an isocyanate component. The chain extenders set forth above are suitable for use in this embodiment. Of course, it is to be understood that any chain extender known in the art may be used by one of skill in the art depending on the desired properties of the TPU. Specific examples of suitable polyether TPUs that may be used in this invention include, but are not limited to, Elastollan® 1000, 1100 and 1200 Series polyether TPUs commercially available from BASF Corporation.

Typically, the polyether and polyester polyols used to form the TPU have a weight average molecular weight of from 600 to 3,000 g/mol. However, the polyols are not limited to this molecular weight range. In one embodiment, starting materials used to form the TPU (e.g., a linear polymeric glycol, a low molecular weight diol, and/or a polyol) have average functionalities of approximately 2.00. For example, any prepolymer or monomer may have 2 terminal reactive groups to promote formation of high molecular weight linear chains with no or few branch points in the TPU.

The isocyanate component that is used to form the TPU typically includes, but is not limited to, isocyanates, diisocyanates, polyisocyanates, biurets of isocyanates and polyisocyanates, isocyanurates of isocyanates and polyisocyanates, and combinations thereof. In one embodiment, the isocyanate component includes an n-functional isocyanate. In this embodiment, n is a number preferably from 2 to 5, more preferably from 2 to 4, still more preferably of from 2 to 3, and most preferably about 2. It is to be understood that n may be an integer or may have intermediate values from 2 to 5. The isocyanate component typically includes an isocyanate selected from the group of aromatic isocyanates, aliphatic isocyanates, and combinations thereof. In another embodiment, the isocyanate component includes an aliphatic isocyanate such as hexamethylene diisocyanate, H12MDI, and combinations thereof. If the isocyanate component includes an aliphatic isocyanate, the isocyanate component may also include a modified multivalent aliphatic isocyanate, i.e., a product which is obtained through chemical reactions of aliphatic diisocyanates and/or aliphatic polyisocyanates. Examples include, but are not limited to, ureas, biurets, allophanates, carbodiimides, uretonimines, isocyanurates, urethane groups, dimers, trimers, and combinations thereof. The isocyanate component may also include, but is not limited to, modified diisocyanates employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof.

Alternatively, the isocyanate component may include an aromatic isocyanate. If the isocyanate component includes an aromatic isocyanate, the aromatic isocyanate may correspond to the formula $R'(NCO)_z$ wherein R' is aromatic and z is an integer that corresponds to the valence of R'. Preferably, z is at least two. Suitable examples of aromatic isocyanates include, but are not limited to, tetramethylxylylene diisocyanate (TMXDI), 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, 3,3'-dimethyldiphenylmethane-4,4'-diisocyanate, triisocyanates such as 4,4',4"-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof. Alternatively, the aromatic isocyanate may include a triisocyanate product of m-TMXDI and 1,1,1-trimethylolpropane, a reaction product of toluene diisocyanate and 1,1,1-trimethylolpropane, and combinations thereof. In one embodiment, the isocyanate component includes a diisocyanate selected from the group of methylene diphenyl diisocyanates, toluene diisocyanates, hexamethylene diisocyanates, H12MDIs, and combinations thereof. The isocyanate component can also react with the polyol and/or chain extender in any amount, as determined by one skilled in the art.

Referring now to the polyamide 6/66 copolymer, this copolymer is a co-polyamide formed from polyamide 6 and polyamide 66 monomers, as is well known in the art. Particularly suitable polyamide 6/66 copolymers for use in the instant invention are commercially available from BASF Corporation under the trade name of Ultramid®. Particularly suitable polyamide 6/66 copolymer include, but are not limited to, Ultramid® C33 01, Ultramid® C33L 01, Ultramid® C33LN 01, Ultramid® C3U, Ultramid® C3U BK23079, Ultramid® C40 L 01, Ultramid® C40LX 01, and combinations thereof.

Referring back to the mixture of the TPU and the polyamide 6/66 copolymer, the mixture may be homogeneous or heterogeneous. Typically, the mixture is heterogeneous. In one embodiment, the mixture includes the TPU in an amount of greater than 50 parts by weight and the polyamide in an amount of less than 50 parts by weight, per 100 parts by weight of the mixture. In another embodiment, the mixture includes the TPU in an amount of from 80 to 90 parts by weight and the polyamide 6/66 copolymer in an amount of from 10 to 20 parts by weight, per 100 parts by weight of the mixture. In a further embodiment, the mixture includes the TPU in an amount of from 95 to 99 parts by weight and the polyamide 6/66 copolymer in an amount of from 1 to 5 parts by weight, per 100 parts by weight of the mixture. Still further, the mixture may include the TPU and the polyamide 6/66 copolymer in equal amounts by weight. In an even further embodiment, the mixture includes the TPU in an amount of from 25 to 99 parts by weight and the polyamide 6/66 copolymer in an amount of from 1 to 75 parts by weight, per 100 parts by weight of the mixture.

It is contemplated that the mixture may consist essentially of the TPU and the polyamide 6/66 copolymer or may consist of the TPU and the polyamide 6/66 copolymer. If the mixture consists essentially of the TPU and the polyamide 6/66 copolymer, the mixture is free of any other polymers or any other chemical compounds that materially affect the basic and novel characteristics of the mixture, e.g. other polyamides or polyamide copolymers, rubbers, polyolefins, halogenated compounds, sulfonated compounds, cross-linking agents, etc. The mixture may be substantially free of any compatibilizer. The terminology "substantially free" refers to an amount of compatibilizer present in the mixture in an amount of less than 0.1 wt %, more preferably in an amount of less than 0.01 wt %, even more preferably in an amount of less than 0.001 wt %, and most preferably in an amount of less than 0.0001 wt %.

In various embodiments, the article (10) and/or the single layer tube (11) may consist essentially of the mixture of the TPU and the polyamide 6/66 copolymer or may consist of the mixture of the TPU and the polyamide 6/66 copolymer. If the article (10) and/or the single layer tube (11) consists essentially of the mixture of the TPU and the polyamide 6/66 copolymer, the article (10) and/or the single layer tube (11) is free of any other polymers or any other chemical compounds that materially affect the basic and novel characteristics of the article (10) and/or the single layer tube (11), such as those described above.

Alternatively, the article (10) and/or the single layer tube (11), the mixture of the TPU and the polyamide 6/66 copolymer, and/or any one or more of the aforementioned layers may include an additional polymer that is different from both the TPU and the polyamide 6/66 copolymer. Any one or more of the aforementioned layers may consist essentially of, or consist of, the additional polymer, so long as the article (10) and/or the single layer tube (11) includes the mixture of the TPU and the polyamide 6/66 copolymer in some amount.

The additional polymer can be any known in the art that is different from the TPU and the polyamide 6/66 copolymer including, but not limited to, polyalkylenes, such as polyethylenes, polypropylenes, polyalkylene naphthalates and terephthalates, polyimides, polyamides, polyetherimides, polystyrenes, acrylonitriles, polycarbonates, polyalkylacrylates, polyacrylates, derivatives of cellulose, halogenated polymers, polysulfones, polyethersulfones, polyacrylonitrile, silicones, epoxies, polyvinylacetates, polyether-amides, ionomeric resins, elastomers, polyurethanes, styrene-butadiene copolymers, styrene-acrylonitrile copolymer, polyesters, polyolefins, polystyrenes, isomers thereof, copolymers thereof, and combinations thereof. Suitable polyamides include, but are not limited to, poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-isophthalic acid) (nylon 4,1), polyhexamethylene isophthalamide (nylon 6,1), hexamethylene adipamide/hexamethylene-isophthalamide (nylon 6,6/61), hexamethylene adipamide/hexamethyleneterephthalamide (nylon 6,6/6T), poly (2,2,2-trimethylhexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and combinations thereof. Non-limiting examples of suitable polyolefins include, but are not limited to, low density polyethylenes, linear low density polyethylenes, linear medium density polyethylenes, linear very-low density polyethylenes, linear ultra-low density polyethylenes, high density polyethylenes, metallocenes, and combinations thereof. Other suitable polyolefins include, but are not limited to, polyethylenes, polypropylenes, polybutylenes, polybutene-1, polypentene-1, poly-3-methylbutene-1, poly-4-methylpentene-1, polyhexene, copolymers of polyolefins, copolymers of olefins, and combinations thereof. Non-limiting examples of suitable polyesters include, but are not limited to, polyethylene terephthalate, glycol modified polyethylene terephthalate, and combinations thereof. Furthermore, the additional polymer can include a TPU that has a Shore Hardness of less than 36D, as determined using DIN EN ISO 1183-1.

The article (10) and/or the single layer tube (11), mixture of the TPU and the polyamide 6/66 copolymer, and/or any of the aforementioned polymers or layers can also include an additive including, but not limited to, oxidative and thermal stabilizers, impact modifiers such as thermoplastic olefins, thermoplastic elastomers, styrene butadiene rubber, and combinations thereof, lubricants, release agents, flame-retarding agents, oxidation inhibitors, oxidation scavengers, neutralizers, antiblock agents, dyes, pigments and other coloring agents, ultraviolet light absorbers and stabilizers, organic or inorganic fillers including particulate and fibrous fillers, reinforcing agents, nucleators, plasticizers, waxes, hot melt adhesives, and combinations thereof. Representative ultraviolet light stabilizers include, but are not limited to, various substituted resorcinols, salicylates, benzotriazole, benzophenones, and combinations thereof. Suitable lubricants and release agents include, but are not limited to, stearic acid, stearyl alcohol, and stearamides. Exemplary flame-retardants include, but are not limited to, organic halogenated compounds, including decabromodiphenyl ether, inorganic compounds, and combinations thereof. Suitable coloring agents including dyes and pigments include, but are not limited to, cadmium sulfide, cadmium selenide, titanium dioxide, phthalocyanines, ultramarine blue, nigrosine, carbon black and combinations thereof. Representative oxidative and thermal stabilizers include, but are not limited to, metal halides, such as sodium halides, potassium halides, lithium halides, cuprous halides, as well as corresponding chlorides, bromides, and iodides, respectively, and combinations thereof. Also, hindered phenols, hydroquinones, aromatic amines, and combinations thereof may be included. Exemplary plasticizers include, but are not limited to, lactams such as caprolactam and lauryl lactam, sulfonamides such as ortho- and para-toluenesulfonamide and N-ethyl, N-butyl benzylnesulfonamide, and combinations thereof, as well as other plasticizers known in the art.

Referring back, the single layer tube (11) typically has a burst pressure, commonly referred to in the art as burst strength, of at least 35, more typically of at least 50, and most typically of at least 60, bar, as determined at 25° C. using DIN 5375A when the inner surface (12) of the single layer tube (11) is circumferential and has an 8 mm diameter and when the outer surface (14) of the single layer tube (11) is circumferential and has a 12 mm external diameter. The single layer tube (11) also typically has a burst pressure of at least 15, more typically of at least 20, and most typically of from at least 25, bar, as determined at 70° C. using DIN 5375A when the inner surface (12) of the single layer tube (11) is circumferential and has an 8 mm diameter and when the outer surface (14) of the single layer tube (11) is circumferential and has a 12 mm external diameter. In various embodiments, the inner surface (12) of the single layer tube (11) is circumferential and has an inner diameter of 5.6 mm and the outer surface (14) is circumferential and has an 8.2 mm external diameter. In these embodiments, the single layer tube (11) typically has a burst pressure of at least 30, more typically of at least 50, and most typically of at least 60, bar, when measured at 25° C. using DIN 5375A. In addition, when measured at 70° C. using DIN 5375A, the single layer tube (11) of these embodiments typically has a burst pressure of at least 20, more typically of at least 30, and most typically of at least 35, bar. The single layer tube (11) of these embodiments may also be tempered at 100° C. for 20 hours according to DIN 5375A. After tempering, the single layer tube (11) typically has a burst pressure of at least 30, more typically of at least 60, and most typically of at least 80, bar, when measured at 25° C. Of course, it is to be understood that the invention is not limited to such burst pressures.

The single layer tube (11) also typically has a density of from 1 g/cm$^3$ to 1.5 g/cm$^3$, more typically of from 1.1 g/cm$^3$ to 1.3 g/cm$^3$, and most typically of from 1.1 g/cm$^3$ to 1.2 g/cm$^3$, as determined using DIN EN ISO 1183-1, A. In addition, in various embodiments, the single layer tube (11) has a Shore D Hardness of at least 36D, more typically of at least 40D, still more typically of at least 50D, and most typically of at least 60D, as determined using DIN 53505. The single layer tube (11) also typically has a tensile strength of at least 20 MPa, more typically of at least 30 MPa, and most typically of at least 40 MPa, as determined using DIN 53504. Further, the single layer tube (11) typically exhibits a percent strain at rupture of from 300% to 450%, more typically of from 320% to 420%, and most typically of from 360% to 420%, as determined using DIN 53504. Still further, the single layer tube (11) typically has a tear strength of at least 90 kN/m, more typically of at least 100 kN/m, and most typically of at least 110 kN/m, as determined using DIN ISO 34-1 B (b). Also, the single layer tube (11) typically has an opacity (i.e. light transmittance) of at least 30, more typically of at least 40, and most typically of at least 50. Opacity is determined using a method developed by BASF Corporation. More specifically, an Ultrascan color measuring instrument that is commercially available from HunterLab is used to determine opacity according to an RSEX (Reflexion Specular Excluded) Method. The brightness value of the single layer tube (11) (L–Value according to DIN 6174) is measured in front of (a) a black background (L–Value Black) and (b) a white background (L–Value White). Then, opacity is calculated using the following formula:

Opacity=[($L$–Value Black)÷($L$–Value White)]×100

Accordingly, an opacity of zero (0) represents total transparency and an Opacity of one-hundred (100) represents total non-transmittal of light. Further, the single layer tube (11) typically has a visual appearance of from transparent to translucent. Alternatively, the single layer tube (11) may not transmit light (i.e., opaque) or may be colored, e.g. white.

In addition, the single layer tube (11) resists kinking. Kinking is determined using a method well known in the coiled tube industry and art. This method utilizes a single layer tube (11) having an inner surface that is circumferential and that has an 8 mm diameter and an outer surface that is circumferential and that has a 12 mm diameter. In this method, the single layer tube (11) is coiled in approximate circles of decreasing diameter until the single layer tube (11) kinks. The method defines a kink as occurring when 10 percent of the outside diameter of the single layer tube (11) is flattened. At this point, the diameter of the approximate circle of the coil is recorded. The single layer tube (11) of this invention typically remains kink free when coiled to form an approximate circle having a diameter of from 3 to 6 cm, more typically of from 4 to 5 cm, and most typically of about 4 cm.

The single layer tube (11) typically has a thickness of from 0.0001 mm to 10 cm. Alternatively, the single layer tube (11) may have a thickness less than 0.0001 mm or greater than 10 cm. Of course, it is to be understood that the aforementioned physical properties and dimensions are not limiting and only describe some embodiments of this invention.

The instant invention also provides a method of forming the single layer tube (11). The method includes the step of extruding the TPU and the polyamide 6/66 copolymer to form the single layer tube (11). The step of extruding may be further defined as simultaneously extruding the TPU and the polyamide 6/66 copolymer from a single extruder or from different extruders. Alternatively, the step of extruding may be further defined as extruding the TPU and the polyamide 6/66 copolymer at different times from the same extruder or from different extruders. The extruder is typically a single or twin screw extruder but may be any extruder known in the art. The conditions of extruding may be any known in the art.

Figure 2:
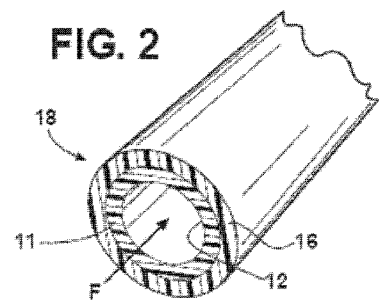
FIG. 2 is an end view of a tube assembly wherein a single layer tube has a circumferential inner surface and a sheath is disposed on the single layer tube.
Figure 4:
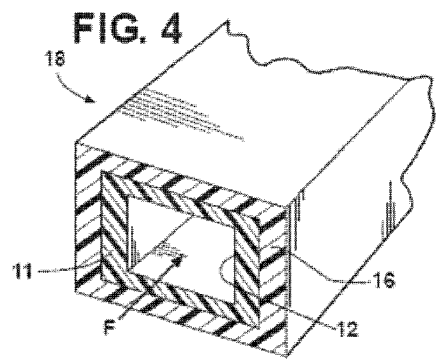
FIG. 4 is an end view of a tube assembly wherein a single layer tube has a rectangular inner surface and a sheath is disposed on the single layer tube.

In addition, the instant invention provides a tube assembly (18) that includes the single layer tube (11) described above and a sheath (16) disposed on the single layer tube (11), as shown in FIGS. 2 and 4. The sheath (16) may act as an outer surface of the tube assembly (18). In another embodiment, the tube assembly (18) includes the single layer tube (11) described above, the sheath (16) disposed on the single layer tube (11), and additional layers disposed on the sheath (16). The sheath (16) includes a polymer that may be the same or different than the thermoplastic polyurethane or the polyamide 6/66 copolymer. In one embodiment, the sheath (16) is the same as the single layer tube (11). In other embodiments, the sheath (16) includes fibers. In one embodiment, the sheath (16) may include of from 1 to about 60 ends of monofilament, continuous multi-filament, e.g. yarn, stranded, cord, roving, thread, tape, or ply, or short strands of a fiber material. The fibers or polymer may be braided, knitted, wrapped, or helically wound. The fibers may be natural or synthetic polymers and may include polyamides, cotton, polyesters, polyamides, aramids, polyolefins, polyvinyl alcohols, polyvinyl acetates, or polyphenylene benzobisoxazoles (PBO), or blends thereof. Alternatively, the fibers may include steel, which may be stainless or galvanized, brass, zinc or zinc-plated, or other metal wire, or blend thereof. The polymers may include polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetrafluoroethylene (ETFE) terpolymer, polyvinylidene fluoride (PVDF), polyvinylfluoride (PVF), polyolefins, polyesters, polyvinyl chloride, ethylene vinyl alcohol, polyacetals, polyoxymethylenes, silicones, thermoplastic rubbers, polyurethanes, vulcanizable or melt-processible rubbers such as SBR, polybutadiene, EPDM, butyl, neoprene, nitriles, polyisoprenes, buna-N, copolymeric rubbers, ethylene-propylene rubbers, ethylene-propylene-diene monomers, nitrile-butadienes, styrene-butadienes, ethylene or propylene-EPDM, EPR, or NBR, copolymers thereof and combinations thereof. In one embodiment, the polymer is further defined as a second thermoplastic polyurethane that is different from the TPU and has a Shore Hardness of at least 36D as determined using DIN EN ISO 1183-1.

The instant invention also provides a method of forming the tube assembly (18). The method includes the step of extruding the TPU and the polyamide 6/66 copolymer, as described above, to form the single layer tube (11). The method also includes the step of disposing the sheath (16) on the single layer tube (11).

The instant invention also provides a method of forming the article (10). The method includes the step of combining the TPU and the polyamide 6/66 copolymer to form the mixture. The step of combining can occur using any method known in the art including, but not limited to, direct extrusion, belt extrusion, reaction extrusion, injection molding, overmolding, vertical mixing, horizontal mixing, feed mixing, and combinations thereof. In one embodiment, the step of combining is further defined as feeding the TPU and the polyamide 6/66 copolymer into a compounding device such as a single- or twin-screw extruder. The TPU and the polyamide 6/66 copolymer may also be mixed together prior to feeding into the compounding device. In one embodiment, a single-screw extruder with an auxiliary mixing mechanism is utilized.

The method may also include the step of heating the TPU and the polyamide 6/66 copolymer while in the compounding device, outside of the compounding device, or both outside of the compounding device and inside the compounding device. It is to be appreciated that the TPU and the polyamide 6/66 copolymer may be heated even if no compounding device is used. The TPU and the polyamide 6/66 copolymer are typically heated to a temperature of from 250° F. to 450° F. and more typically to a temperature of from 350° F. to 430° F. It is believed that the heating promotes compounding of the TPU and the polyamide 6/66 copolymer. The TPU and the polyamide 6/66 copolymer may also be tempered.

In one embodiment, the method includes the step of extruding the TPU and the polyamide 6/66 copolymer in a twin-screw extruder to form the article (10). In another embodiment, the TPU and the polyamide 6/66 copolymer are extruded at a temperature of less than or equal to about 370° F. to form the article (10). At this temperature, the article (10) typically has a matte finish, as visually observed. Alternatively, the TPU and the polyamide 6/66 copolymer are fed into a twin screw extruder and extruded at a temperature of greater than or equal to about 400° F. At this temperature, the article (10) typically has a glossy finish, as visually observed.

The step of extruding may be further defined as simultaneously extruding the TPU and the polyamide 6/66 copolymer from a single extruder or from different extruders. Alternatively, the TPU and the polyamide 6/66 copolymer can be extruded separately, at different times, and from the same extruder or from different extruders. The conditions of extruding may be any known in the art.

In another embodiment, the method includes the step of injection molding the TPU and the polyamide 6/66 copolymer to form the article (10). The conditions used in the step of injection molding may be any known in the art. Typically, the step of injection molding is further defined as melting pellets of the TPU and the polyamide 6/66 copolymer in a zone of an extruder to form a molten mixture of the TPU and the polyamide 6/66 copolymer and forcing the molten mixture into either an open or closed mold using pressure. The molten mixture typically takes the shape of the mold. Then, the molten mixture cools, is removed from the mold, and solidifies.

In still another embodiment, the method includes the step of overmolding the TPU and the polyamide 6/66 copolymer to form the article (10). The conditions used in the step of overmolding may also be any known in the art. Typically, the step of overmolding is used to create the article (10) with two or more well bonded layers. Traditional joining techniques, such as snap-fit designs, mechanical fasteners, adhesion and welding techniques (ultrasonic and heat) may be used. In one embodiment, the step of over-molding is further defined as sequentially placing an injection molded part into either an open or closed mold, and molding the mixture of the TPU and the polyamide 6/66 copolymer over the injection molded part, thereby forming the article (10) of this invention. Alternatively, the step of overmolding can be further defined as co-injecting a polymer or plastic and a mixture TPU and the polyamide 6/66 copolymer into a mold at the same time from different injection points to form the article (10) of this invention.

In alternative embodiments, the method includes the step of forming the first layer (20) including the mixture of the TPU and the polyamide 6/66 copolymer and also includes the step of forming the second layer (22) on the first layer (20). The third layer (24), and/or any additional layers, such as those described above, can also be formed on the first or second layers (12, 14) or on both the first and second layers (12, 14). One or more of the aforementioned layers (12-32) can be formed utilizing extrusion conditions as described above either sequentially or simultaneously and from one or more extruders.

In various embodiments, the TPU and the polyamide 6/66 copolymer, as well as any additional polymers, are introduced into multiple in-feed hoppers of two or more extruders. The two or more extruders typically melt and plasticize the TPU, the polyamide 6/66 copolymer, and any additional polymers.

In still another embodiment, first and the second extruders form two separate streams of (i) the TPU and the polyamide 6/66 copolymer and (ii) the additional polymer, respectively. The streams from the first and second extruders are typically fed into a single manifold extrusion die or a multi manifold extrusion die to form one or more of the aforementioned layers (12-32). While in the extrusion die, one or more of the aforementioned layers (12-32) may be juxtaposed and combined, and emerge from the co-extrusion die as the article (10). However, it is also contemplated that the article (10) can be formed using a single manifold extrusion die utilizing feedblock technology.

It is further contemplated that one or more of the aforementioned layers (12-32) can be melt-bonded together. Melt-bonding includes directly applying a subject film layer to an object film layer wherein both the subject and object film layers are in a partially softened or molten form. A suitable melt-bonding technique includes lamination techniques known in the art.

In one embodiment, the method includes the step of extruding the mixture of the TPU and the polyamide 6/66 copolymer to form the film. In this embodiment, the film exits an extrusion die and is typically cast onto and passed around a first controlled temperature casting roll. The film is then typically passed onto a second controlled temperature casting roll, which is normally cooler than the first controlled temperature casting roll. The first and second controlled temperature casting rolls largely control the rate of cooling of the film after it exits the co-extrusion die. Additional controlled temperature casting rolls may also be employed.

Alternatively, one or more of the aforementioned layers, the mixture of the TPU and the polyamide 6/66 copolymer, or the article (10) itself may be thermoformed. Typically, thermoforming creates articles (10) from already extruded sheets of the mixture of the TPU and polyamide 6/66 copolymer through application of vacuum and/or heat. In one embodiment, the step of thermoforming includes an automatic high speed positioning of a sheet or film of this invention having an accurately controlled temperature into a pneumatically actuated forming station whereby a shape of the sheet or film is defined by a mold. The sheet or film, after being positioned, may be trimmed or cut, as is known in the art. A variety of techniques can be used including, but not limited to, use of a drape, vacuum, pressure, matched die, billow drape, vacuum snap-back, billow vacuum, plug assist vacuum, reverse draw with plug assist, trapped sheet, slip, diaphragm, twin-sheet cut sheet, and combinations thereof. The step of thermoforming may also utilize a freeblowing technique, a pressure bubble immersion technique, a twin-sheet roll-fed technique, a pillow-forming technique, a blow-molding technique, an extrusion blow-molding technique, and combinations thereof. Specifically, blow-molding includes expanding a heated parison against surfaces of a mold using compressed gasses.

EXAMPLES

Four compositions (Compositions 1-4) and twelve comparative compositions (Comparative Compositions 1-12) are formed and then used to form corresponding injection molded plaques (Plaques 1-4 and Comparative Plaques 1-12), respectively. The Compositions 1-4 and Comparative Compositions 1-12 are also used to form corresponding tubes (Tubes 1-4 and Comparative Tubes 1-12), respectively. The Compositions, Plaques, and Tubes 1-4 represent this invention. The Comparative Compositions, Plaques, and Tubes 1-12 do not represent this invention and are used for comparative purposes only. The Compositions 1-4 and Comparative Compositions 1-12 are set forth in Table 1 below wherein all data is in parts by weight per 100 parts by weight of the Compositions.

TABLE 1

|  | Composition 1 | Composition 2 | Composition 3 | Composition 4 |
|---|---|---|---|---|
| TPU 1 | 85 | 85 | — | — |
| TPU 2 | — | — | 85 | — |
| TPU 3 | — | — | — | 85 |
| TPU 4 | — | — | — | — |
| TPU 5 | — | — | — | — |
| TPU 6 | — | — | — | — |
| TPU 7 | — | — | — | — |
| Polyamide 6/66 | 15 | 15 | 15 | 15 |
| Polyamide 6 | — | — | — | — |
| Polyamide 66 | — | — | — | — |
| Polyamide 11 | — | — | — | — |
| Polyamide 12 | — | — | — | — |

|  | Comparative Composition 1 | Comparative Composition 2 | Comparative Composition 3 | Comparative Composition 4 |
|---|---|---|---|---|
| TPU 1 | 100 | — | — | 85 |
| TPU 2 | — | 100 | — | — |
| TPU 3 | — | — | 100 | — |
| TPU 4 | — | — | — | — |
| TPU 5 | — | — | — | — |
| TPU 6 | — | — | — | — |
| TPU 7 | — | — | — | — |
| Polyamide 6/66 | — | — | — | — |
| Polyamide 6 | — | — | — | 15 |
| Polyamide 66 | — | — | — | — |
| Polyamide 11 | — | — | — | — |
| Polyamide 12 | — | — | — | — |

|  | Comparative Composition 5 | Comparative Composition 6 | Comparative Composition 7 | Comparative Composition 8 |
|---|---|---|---|---|
| TPU 1 | 85 | 85 | 85 | — |
| TPU 2 | — | — | — | — |
| TPU 3 | — | — | — | — |
| TPU 4 | — | — | — | — |
| TPU 5 | — | — | — | — |
| TPU 6 | — | — | — | — |
| TPU 7 | — | — | — | — |
| Polyamide 6/66 | — | — | — | 100 |
| Polyamide 6 | — | — | — | — |

TABLE 1-continued

| | | | | |
|---|---|---|---|---|
| Polyamide 66 | 15 | — | — | — |
| Polyamide 11 | — | 15 | — | — |
| Polyamide 12 | — | — | 15 | — |

| | Comparative Composition 9 | Comparative Composition 10 | Comparative Composition 11 | Comparative Composition 12 |
|---|---|---|---|---|
| TPU 1 | — | — | — | — |
| TPU 2 | — | — | — | — |
| TPU 3 | — | — | — | — |
| TPU 4 | — | — | — | — |
| TPU 5 | — | — | — | — |
| TPU 6 | — | — | — | — |
| TPU 7 | — | — | — | — |
| Polyamide 6/66 | — | — | — | — |
| Polyamide 6 | 100 | — | — | — |
| Polyamide 66 | — | 100 | — | — |
| Polyamide 11 | — | — | 100 | — |
| Polyamide 12 | — | — | — | 100 |

TPU 1 is a polyether TPU commercially available from BASF Corporation under the trade name of Elastollan® 1164D having a Shore Hardness of approximately 64D.
TPU 2 is a polyether TPU commercially available from BASF Corporation under the trade name of Elastollan® 1154D having a Shore Hardness of approximately 54D.
TPU 3 is a polyether TPU commercially available from BASF Corporation under the trade name of Elastollan® 1195A having a Shore Hardness of approximately 95A.
TPU 4 is a polyether TPU commercially available from BASF Corporation under the trade name of Elastollan® 1185A having a Shore Hardness of approximately 85A.
TPU 5 is a polyester TPU commercially available from BASF Corporation under the trade name of Elastollan® C98A having a Shore Hardness of approximately 98A.
TPU 6 is a polyether TPU commercially available from BASF Corporation under the trade name of Elastollan® 1160D having a Shore Hardness of approximately 60D.
TPU 7 is a polyether TPU commercially available from BASF Corporation under the trade name of Elastollan® 1198A having a Shore Hardness of approximately 98A.
Polyamide 6/66 is a copolymer of polyamide 6 and polyamide 66 and is commercially available from BASF Corporation under the trade name of Ultramid® C33 01.
Polyamide 6 is commercially available from BASF Corporation under the trade name of Ultramid® B3S.
Polyamide 66 is commercially available from BASF Corporation under the trade name of Ultramid® A3K.
Polyamide 11 is well known in the art and is commercially available from Arkema, Inc. under the trade name of Rilsan® PA 11.
Polyamide 12 is well known in the art and is commercially available from Evonik De-gussa under the trade name of Vestamid® X7393.

Preparation of Compositions 1-4 and Comparative Compositions 6 and 7:

Compositions 1 and 2 are formed, respectively, using the same TPU and polyamide 6/66 copolymer in identical amounts. However, Composition 1 is prepared by compounding the TPU and the polyamide 6/66 copolymer using a twin-screw extruder (Berstorff ZE 40). More specifically, dried TPU with a moisture content of less than 0.02 weight percent and dried polyamide 6/66 copolymer are mixed in a weight ratio of 85% TPU:15% polyamide 6/66 copolymer, as described in detail below.

As is well known in the art, compounding is a technique to prepare mixtures. Use of the twin-screw extruder forms strands of the mixture of the TPU and the polyamide. The twin-screw extruder includes two screws that rotate at a certain speed (RPM) in a metal barrel to move the mixture of the TPU and the polyamide through the barrel. The barrel provides a bearing surface where shear is imparted to the mixture of the TPU and the polyamide. Heating media are housed around the barrel and establish temperature zones in the barrel that are varied according to processing conditions known to those of skill in the art. More specifically, the TPU and the polyamide are added to the twin-screw extruder in a first zone (Zone 1) and passed through a series of nine additional zones (Zones 2-10) that are heated to varying temperatures. A vacuum of about 100 mbar is drawn in Zone 8. Then, the mixture of the TPU and the polyamide is pushed through a strand die to form the strands that are cooled to solidify in a water tank. Subsequently, the strands are fed into a pelletizer to create pellets which are then stored for use in injection molding, as described in detail below. The conditions used to compound Composition 1 are set forth in Table 2a below.

TABLE 2a

| Compounding Parameters for Composition 1 | |
|---|---|
| Zone 1 Temperature | 410° F. |
| Zone 2 Temperature | 430° F. |
| Zone 3 Temperature | 430° F. |
| Zone 4 Temperature | 430° F. |
| Zone 5 Temperature | 430° F. |
| Zone 6 Temperature | 430° F. |
| Zone 7 Temperature | 430° F. |
| Zone 8 Temperature | 430° F. |
| Zone 9 Temperature | 430° F. |
| Zone 10 Temperature | 430° F. |
| Die Temperature | 430° F. |
| Speed Torque (RPM) | 170 |
| Torque (Amper) | 36 |
| Production Rate (lb/h) | 77 |
| Melt Temperature | 430° F. |
| Melt Pressure (psi) | 261 |

Composition 2, on the other hand, is prepared by dry blending the TPU and the polyamide 6/66 copolymer without any previous compounding.

Compositions 3 and 4, and also Comparative Compositions 6 and 7, are compounded using the same twin-screw extruder and process described above with modified compounding parameters, as set forth in Tables 2b-2e below.

TABLE 2b

| Compounding Parameters for Composition 3 | |
|---|---|
| Zone 1 Temperature | 390° F. |
| Zone 2 Temperature | 410° F. |
| Zone 3 Temperature | 410° F. |
| Zone 4 Temperature | 410° F. |

TABLE 2b-continued

Compounding Parameters for Composition 3

| | |
|---|---|
| Zone 5 Temperature | 410° F. |
| Zone 6 Temperature | 410° F. |
| Zone 7 Temperature | 410° F. |
| Zone 8 Temperature | 410° F. |
| Zone 9 Temperature | 410° F. |
| Zone 10 Temperature | 410° F. |
| Die Temperature | 410° F. |
| Speed Torque (RPM) | 170 |
| Torque (Amper) | 37 |
| Production Rate (lb/h) | 66 |
| Melt Temperature | 420° F. |
| Melt Pressure (psi) | 261 |

TABLE 2c

Compounding Parameters for Composition 4

| | |
|---|---|
| Zone 1 Temperature | 390° F. |
| Zone 2 Temperature | 390° F. |
| Zone 3 Temperature | 390° F. |
| Zone 4 Temperature | 390° F. |
| Zone 5 Temperature | 390° F. |
| Zone 6 Temperature | 390° F. |
| Zone 7 Temperature | 410° F. |
| Zone 8 Temperature | 410° F. |
| Zone 9 Temperature | 410° F. |
| Zone 10 Temperature | 410° F. |
| Die Temperature | 410° F. |
| Speed Torque (RPM) | 170 |
| Torque (Amper) | 34 |
| Production Rate (lb/h) | 66 |
| Melt Temperature | 406° F. |
| Melt Pressure (psi) | 160 |

TABLE 2d

Compounding Parameters for Comparative Composition 6

| | |
|---|---|
| Zone 1 Temperature | 428° F. |
| Zone 2 Temperature | 428° F. |
| Zone 3 Temperature | 428° F. |
| Zone 4 Temperature | 428° F. |
| Zone 5 Temperature | 428° F. |
| Zone 6 Temperature | 428° F. |
| Zone 7 Temperature | 428° F. |
| Zone 8 Temperature | 428° F. |
| Zone 9 Temperature | 428° F. |
| Zone 10 Temperature | 428° F. |
| Die Temperature | 428° F. |
| Speed Torque (RPM) | 212 |
| Torque (Amper) | 41 |
| Production Rate (lb/h) | 88 |
| Melt Temperature | 446° F. |
| Melt Pressure (psi) | 276 |

TABLE 2e

Compounding Parameters for Comparative Composition 7

| | |
|---|---|
| Zone 1 Temperature | 410° F. |
| Zone 2 Temperature | 410° F. |
| Zone 3 Temperature | 410° F. |
| Zone 4 Temperature | 410° F. |
| Zone 5 Temperature | 410° F. |
| Zone 6 Temperature | 410° F. |
| Zone 7 Temperature | 410° F. |
| Zone 8 Temperature | 428° F. |
| Zone 9 Temperature | 428° F. |
| Zone 10 Temperature | 428° F. |
| Die Temperature | 446T |
| Speed Torque (RPM) | 161 |
| Torque (Amper) | 42 |
| Production Rate (lb/h) | 88 |
| Melt Temperature | 446° F. |
| Melt Pressure (psi) | 160 |

Attempts to form Comparative Compositions 4 and 5 are unsuccessful because the melting temperature of polyamide 6 is greater than 220° C. (~428° F.), the melting temperature of polyamide 66 is greater than 260° C. (~500° F.), and the melting temperature of the TPU is approximately 200° C. (~392° F.). When the TPU is processed at temperatures greater than 220° C., the TPU starts to thermally degrade. Thus, a viable mixture of the TPU and the polyamide 6 or polyamide 66 cannot be formed which prevents Comparative Compositions 4 and 5 from being formed.

Formation of Plaques 1-4 and Comparative Plaques 1-3 and 6-12:

After formation, each of the Compositions 1-4 and Comparative Compositions 1-3 and 6-12 are used to form injection molded Plaques 1-4 and Comparative Plaques 1-3 and 6-12, respectively. These Plaques are then used to determine physical properties of the Compositions.

To form the Plaques, each of the Compositions is injected from an extruder with multiple temperature zones (Zones 1-3) into a temperature controlled mold for a certain amount of time (injection time). The Compositions are injected into the temperature controlled mold through a temperature controlled nozzle and a temperature controlled sprue. The temperature of the nozzle and sprue are controlled to promote consistent physical properties of the Compositions. The nozzle and sprue connect the extruder to the temperature controlled mold. The temperature controlled mold provides flow passage to the Compositions, provides a passage for air to escape, and provides a means to cool the Compositions. As is well known in the art, the Compositions are injected into the temperature controlled mold to fill the mold to approximately 95% volume capacity. Subsequently, the temperature controlled mold is packed under pressure to approximately 100% volume capacity to promote removal of air in the mold. Then, the mold is held at a holding pressure while the Plaques are formed. The Plaques formed by this method are approximately 3.5×4.5×0.08 inches in size and are formed via injection molding the Compositions using the parameters set forth in Table 3 below.

TABLE 3

| Molding Conditions | Plaque 1 | Plaque 2 | Plaque 3 | Plaque 4 |
|---|---|---|---|---|
| Nozzle Temperature (° F.) | 420 | 430 | 430 | 420 |
| Zone 1 Temperature (° F.) | 415 | 425 | 425 | 410 |
| Zone 2 Temperature (° F.) | 410 | 415 | 420 | 400 |
| Zone 3 Temperature (° F.) | 400 | 410 | 410 | 390 |
| Mold Temperature (° F.) | 80 | 90 | 90 | 80 |
| Sprue Temperature (° F.) | 420 | 425 | 415 | 410 |
| Injection High Time (seconds) | 3 | 4 | 4 | 3 |

TABLE 3-continued

| | | | | |
|---|---|---|---|---|
| Pack time (seconds) | 8 | 8 | 8 | 8 |
| Hold time (seconds) | 6 | 8 | 8 | 8 |
| Cool time (seconds) | 12 | 8 | 8 | 10 |
| Delay time (seconds) | 0 | 0 | 0 | 0 |
| Screw RPM | 30 | 30 | 30 | 30 |
| Packing Pressure (psi) | 800 | 800 | 800 | 800 |
| Holding Pressure (psi) | 700 | 700 | 700 | 700 |
| Back Pressure (psi) | 200 | 200 | 200 | 200 |
| Transfer Position (in) | 0.28 | 0.28 | 0.28 | 0.3 |
| Transfer Pressure (psi) | 1470 | 1222 | 980 | 1190 |

| Molding Conditions | Comparative Plaque 1 | Comparative Plaque 2 | Comparative Plaque 3 | Comparative Plaque 4 |
|---|---|---|---|---|
| Nozzle Temperature (° F.) | 445 | 450 | 420 | N/A |
| Zone 1 Temperature (° F.) | 440 | 445 | 410 | N/A |
| Zone 2 Temperature (° F.) | 435 | 440 | 400 | N/A |
| Zone 3 Temperature (° F.) | 425 | 430 | 390 | N/A |
| Mold Temperature (° F.) | 90 | 90 | 80 | N/A |
| Sprue Temperature (° F.) | 540 | 480 | 390 | N/A |
| Injection High Time (second) | 4 | 4 | 2 | N/A |
| Pack time (second) | 6 | 8 | 8 | N/A |
| Hold time (second) | 8 | 8 | 8 | N/A |
| Cool time (second) | 10 | 10 | 10 | N/A |
| Delay time (second) | 0 | 0 | 0 | N/A |
| Screw RPM | 30 | 30 | 35 | N/A |
| Packing Pressure (psi) | 700 | 750 | 850 | N/A |
| Holding Pressure (psi) | 700 | 600 | 800 | N/A |
| Back Pressure (psi) | 100 | 200 | 50 | N/A |
| Transfer Position (in) | 0.28 | 0.29 | 0.32 | N/A |
| Transfer Pressure (psi) | 900 | 700 | 1240 | N/A |

| Molding Conditions | Comparative Plaque 5 | Comparative Plaque 6 | Comparative Plaque 7 | Comparative Plaque 8 |
|---|---|---|---|---|
| Nozzle Temperature (° F.) | N/A | 430 | 430 | 410 |
| Zone 1 Temperature (° F.) | N/A | 425 | 425 | 405 |
| Zone 2 Temperature (° F.) | N/A | 415 | 415 | 400 |
| Zone 3 Temperature (° F.) | N/A | 410 | 410 | 390 |
| Mold Temperature (° F.) | N/A | 90 | 90 | 80 |
| Sprue Temperature (° F.) | N/A | 425 | 425 | 410 |
| Injection High Time (second) | N/A | 4 | 4 | 3 |
| Pack time (second) | N/A | 8 | 8 | 6 |
| Hold time (second) | N/A | 8 | 8 | 6 |
| Cool time (second) | N/A | 8 | 8 | 8 |
| Delay time (second) | N/A | 0 | 0 | 0 |
| Screw RPM | N/A | 30 | 30 | 30 |
| Packing Pressure (psi) | N/A | 800 | 800 | 800 |
| Holding Pressure (psi) | N/A | 700 | 700 | 700 |
| Back Pressure (psi) | N/A | 200 | 200 | 200 |
| Transfer Position (in) | N/A | 0.28 | 0.28 | 0.3 |
| Transfer Pressure (psi) | N/A | 1222 | 1222 | 1700 |

| Molding Conditions | Comparative Plaque 9 | Comparative Plaque 10 | Comparative Plaque 11 | Comparative Plaque 12 |
|---|---|---|---|---|
| Nozzle Temperature (° F.) | 465 | 550 | 450 | 450 |
| Zone 1 Temperature (° F.) | 455 | 545 | 440 | 440 |
| Zone 2 Temperature (° F.) | 450 | 540 | 430 | 430 |
| Zone 3 Temperature (° F.) | 445 | 530 | 420 | 420 |
| Mold Temperature (° F.) | 90 | 120 | 90 | 90 |
| Sprue Temperature (° F.) | 600 | 700 | 470 | 470 |
| Injection High Time (second) | 2 | 3 | 4 | 4 |
| Pack time (second) | 5 | 6 | 10 | 10 |
| Hold time (second) | 5 | 8 | 6 | 6 |
| Cool time (second) | 7 | 10 | 10 | 10 |
| Delay time (second) | 0 | 0 | 0 | 0 |
| Screw RPM | 30 | 30 | 30 | 30 |
| Packing Pressure (psi) | 650 | 600 | 800 | 800 |
| Holding Pressure (psi) | 500 | 500 | 700 | 700 |
| Back Pressure (psi) | 100 | 200 | 200 | 200 |
| Transfer Position (in) | 0.3 | 0.3 | 0.29 | 0.29 |
| Transfer Pressure (psi) | 1100 | 750 | 1550 | 1550 |

Attempts to form Comparative Plaques 4 and 5 are unsuccessful because the melting temperature of polyamide 6 is greater than 220° C. (–428° F.), the melting temperature of polyamide 66 is greater than 260° C. (–500° F.), and the melting temperature of the TPU is approximately 200° C. (–392° F.). When the TPU is processed at temperatures greater than 220° C., the TPU starts to thermally degrade. Thus, a viable mixture of the TPU and the polyamide 6 or polyamide 66 cannot be formed which prevents Comparative Plaques 4 and 5 from being formed.

Furthermore, the Compositions 1-4 and Comparative Compositions 1-3 and 6-12 are used to form the Tubes 1-4 and the Comparative Tubes 1-3 and 6-12, respectively. Each of the Tubes 1-4 and the Comparative Tubes 1-3 and 6-12 are formed via extrusion in a single-screw extruder. Conditions used to form the Tubes 1-4 and the Comparative Tubes 1-3 and 6-12 in the single-screw extruder are set forth in Table 4 below:

Attempts to form Comparative Tubes 4 and 5 are unsuccessful because the melting temperature of polyamide 6 is greater than 220° C. (–428° F.), the melting temperature of polyamide 66 is greater than 260° C. (–500° F.), and the melting temperature of the TPU is approximately 200° C. (–392° F.). When the TPU is processed at temperatures greater than 220° C., the TPU starts to thermally degrade. Thus, a viable mixture of the TPU and the polyamide 6 or polyamide 66 cannot be formed which prevents Comparative Tubes 4 and 5 from being formed.

Evaluation of Plaques/Tubes 1-4 and Comparative Plaques/Tubes 1-3 and 6-12:

After formation, each of the Plaques 1-4 and the Comparative Plaques 1-3 and 6-12 are evaluated to determine Opacity, Density, Hardness (Shore D or Rockwell), Tensile Strength, Strain at Rupture, and Tear Strength. The results of these evaluations are set forth in Table 5 below. In addition, each of the Tubes 1-4 and Comparative Tubes 1-3 and 6-12 are evaluated to determine Visual Appearance, mean burst pressures (Mean Burst Pressures 1-5), and Kinking. The results of these evaluations are also set forth in Table 5 below.

TABLE 4

| Extrusion Conditions | Tube 1 | Tube 2 | Tube 3 | Tube 4 |
|---|---|---|---|---|
| Zone 1 Temperature (° F.) | 390 | 390 | 375 | 370 |
| Zone 2 Temperature (° F.) | 410 | 410 | 385 | 380 |
| Zone 3 Temperature (° F.) | 420 | 420 | 395 | 390 |
| Gate Temperature (° F.) | 420 | 420 | 395 | 390 |
| Adaptor Temperature (° F.) | 400 | 400 | 385 | 380 |
| Die Temperature (° F.) | 395 | 395 | 375 | 370 |
| Melt Temperature (° F.) | 423 | 423 | 401 | 396 |

| Extrusion Conditions | Comparative Tube 1 | Comparative Tube 2 | Comparative Tube 3 | Comparative Tube 4 |
|---|---|---|---|---|
| Zone 1 Temperature (° F.) | 340 | 330 | 320 | Not Available |
| Zone 2 Temperature (° F.) | 375 | 360 | 350 | Not Available |
| Zone 3 Temperature (° F.) | 390 | 375 | 360 | Not Available |
| Gate Temperature (° F.) | 420 | 400 | 390 | Not Available |
| Adaptor Temperature (° F.) | 435 | 420 | 400 | Not Available |
| Die Temperature (° F.) | 360 | 375 | 380 | Not Available |
| Melt Temperature (° F.) | 410 | 400 | 390 | Not Available |

| Extrusion Conditions | Comparative Tube 5 | Comparative Tube 6 | Comparative Tube 7 | Comparative Tube 8 |
|---|---|---|---|---|
| Zone 1 Temperature (° F.) | Not Available | 375 | 375 | 375 |
| Zone 2 Temperature (° F.) | Not Available | 395 | 395 | 395 |
| Zone 3 Temperature (° F.) | Not Available | 400 | 400 | 395 |
| Gate Temperature (° F.) | Not Available | 410 | 410 | 390 |
| Adaptor Temperature (° F.) | Not Available | 420 | 420 | 410 |
| Die Temperature (° F.) | Not Available | 410 | 410 | 400 |
| Melt Temperature (° F.) | Not Available | 420 | 420 | 410 |

| Extrusion Conditions | Comparative Tube 9 | Comparative Tube 10 | Comparative Tube 11 | Comparative Tube 12 |
|---|---|---|---|---|
| Zone 1 Temperature (° F.) | 420 | 510 | 410 | 410 |
| Zone 2 Temperature (° F.) | 435 | 525 | 415 | 420 |
| Zone 3 Temperature (° F.) | 440 | 550 | 430 | 430 |
| Gate Temperature (° F.) | 430 | 540 | 420 | 420 |
| Adaptor Temperature (° F.) | 440 | 550 | 430 | 430 |
| Die Temperature (° F.) | 430 | 535 | 520 | 520 |
| Melt Temperature (° F.) | 440 | 550 | 430 | 430 |

TABLE 5

| Evaluations After Formation | Plaque/Tube 1 | Plaque/Tube 2 | Plaque/Tube 3 | Plaque/Tube 4 |
| --- | --- | --- | --- | --- |
| Evaluation of Plaques | | | | |
| Opacity (%) | 56 | 60 | 43 | 41 |
| Density (g/cm$^3$) | 1.17 | 1.17 | 1.16 | 1.14 |
| Hardness (Shore D) | 65 | 68 | 60 | 54 |
| Tensile Strength (MPa) | 44 | 40 | 38 | 30 |
| Strain at Rupture (%) | 400 | 370 | 430 | 410 |
| Tear Strength (kN/m) | 150 | 160 | 118 | 101 |
| Visual Appearance | TL | TL | TL | TL |
| Evaluation of Tubes | | | | |
| Visual Appearance | TL | TL | TL | TL |
| Mean Burst Pressure 1, 25° C. (bar) | 64 | 64 | 61 | 41 |
| Mean Burst Pressure 2, 70° C. (bar) | 27 | 29 | 28 | 22 |
| Mean Burst Pressure 3, 25° C. (bar) | 63 | 64 | 51 | 35 |
| Mean Burst Pressure 4, 25° C. (bar) | 81 | 83 | 61 | 40 |
| Mean Burst Pressure 5, 70° C. (bar) | 36 | 38 | 33 | 26 |
| Kinking At 4 cm Coil Diameter | No | No | No | No |

| Evaluations After Formation | Comparative Plaque/Tube 1 | Comparative Plaque/Tube 2 | Comparative Plaque/Tube 3 | Comparative Plaque/Tube 4 |
| --- | --- | --- | --- | --- |
| Evaluation of Plaques | | | | |
| Opacity (%) | 17 | 30 | 6 | Not Available |
| Density (g/cm$^3$) | 1.18 | 1.16 | 1.14 | Not Available |
| Hardness (Shore D) | 64 | 57 | 50 | Not Available |
| Tensile Strength (MPa) | 52 | 63 | 52 | Not Available |
| Strain at Rupture (%) | 370 | 530 | 550 | Not Available |
| Tear Strength (kN/m) | 185 | 156 | 99 | Not Available |
| Visual Appearance | TL | TL | TP | Not Available |
| Evaluation of Tubes | | | | |
| Visual Appearance | TL | TL | TP | Not Available |
| Mean Burst Pressure 1, 25° C. (bar) | 62 | Not Available | Not Available | Not Available |
| Mean Burst Pressure 2, 70° C. (bar) | 24 | Not Available | Not Available | Not Available |
| Mean Burst Pressure 3, 25° C. (bar) | Not Available | Not Available | Not Available | Not Available |
| Mean Burst Pressure 4, 25° C. (bar) | 48 | 38 | 21 | Not Available |
| Mean Burst Pressure 5, 70° C. (bar) | Not Available | 15 | 11 | Not Available |
| Kinking At 4 cm Coil Diameter | No | No | No | Not Available |

| Evaluations After Formation | Comparative Plaque/Tube 5 | Comparative Plaque/Tube 6 | Comparative Plaque/Tube 7 | Comparative Plaque/Tube 8 |
| --- | --- | --- | --- | --- |
| Evaluation of Plaques | | | | |
| Opacity (%) | Not Available | 84 | 84 | Not Available |
| Density (g/cm$^3$) | Not Available | 1.14 | 1.14 | 1.12 |
| Hardness (Shore D) | Not Available | 60 | 60 | Not Available |
| Tensile Strength (MPa) | Not Available | 46 | 46 | 56 |
| Strain at Rupture (%) | Not Available | 420 | 420 | >300 |
| Tear Strength (kN/m) | Not Available | 137 | 137 | Not Available |
| Visual Appearance | Not Available | W | W | W |
| Evaluation of Tubes | | | | |
| Visual Appearance | Not Available | W | W | W |
| Mean Burst Pressure 1, 25° C. (bar) | Not Available | 60 | 60 | Not Available |
| Mean Burst Pressure 2, 70° C. (bar) | Not Available | 25 | 25 | Not Available |
| Mean Burst Pressure 3, 25° C. (bar) | Not Available | 45 | 45 | Not Available |
| Mean Burst Pressure 4, 25° C. (bar) | Not Available | 51 | 51 | Not Available |
| Mean Burst Pressure 5, 70° C. (bar) | Not Available | 27 | 27 | Not Available |
| Kinking At 4 cm Coil Diameter | Not Available | No | No | Yes |

| Evaluations After Formation | Comparative Plaque/Tube 9 | Comparative Plaque/Tube 10 | Comparative Plaque/Tube 11 | Comparative Plaque/Tube 12 |
| --- | --- | --- | --- | --- |
| Evaluation of Plaques | | | | |
| Opacity (%) | Not Available | Not Available | Not Available | Not Available |
| Density (g/cm$^3$) | 1.13 | 1.24 | 1.03 | 1.02 |
| Hardness | 120 (Rockwell) | 122 (Rockwell) | 108 (Rockwell) | 73 (Shore D) |
| Tensile Strength (MPa) | 86 | 120 | 65.5 | 47 |
| Strain at Rupture (%) | 50 | 4 | 10 | 280 |
| Tear Strength (kN/m) | Not Available | Not Available | Not Available | Not Available |
| Visual Appearance | TP | OP | W | W |

TABLE 5-continued

Evaluation of Tubes

| Visual Appearance | TP | OP | W | W |
|---|---|---|---|---|
| Mean Burst Pressure 1, 25° C. (bar) | Not Available | Not Available | Not Available | Not Available |
| Mean Burst Pressure 2, 70° C. (bar) | Not Available | Not Available | Not Available | Not Available |
| Mean Burst Pressure 3, 25° C. (bar) | Not Available | Not Available | Not Available | Not Available |
| Mean Burst Pressure 4, 25° C. (bar) | Not Available | Not Available | Not Available | Not Available |
| Mean Burst Pressure 5, 70° C. (bar) | Not Available | Not Available | Not Available | Not Available |
| Kinking At 4 cm Coil Diameter | Yes | Yes | Yes | Yes |

Evaluation of Plaques 1-4 and Comparative Plaques 1-3 and 6-12:

Opacity is determined using the Plaques described above and a method developed by BASF Corporation. More specifically, an Ultrascan color measuring instrument that is commercially available from HunterLab is used to determine Opacity according to an RSEX (Reflexion Specular Excluded) Method. The brightness value of the Plaques (L–Value according to DIN 6174) is measured in front of (a) a black background (L–Value Black) and (b) a white background (L–Value White). Then, Opacity is calculated using the following formula:

Opacity=[(L–Value Black)÷(L–Value White)]×100.

Accordingly, an Opacity of zero (0) represents total transparency and a Opacity of one-hundred (100) represents total non-transmittal of light.

Density is determined using the Plaques described above and one of DIN EN ISO 1183-1, A.

Hardness is evaluated and reported as Shore Hardness or Rockwell Hardness, depending on the polyamide, as is known in the art. Shore Hardness for Plaques 1-4 and Comparative Plaques 1-3, 6, 7 and 12 is determined using DIN 53505. Rockwell Hardness for Comparative Plaques 8-11 is determined using ASTM D785.

Tensile Strength is determined using the Plaques described above and DIN 53504, as is known in the art.

Strain at Rupture is determined using the Plaques described above and DIN 53504, as is known in the art.

Tear Strength is determined using the Plaques described above and DIN ISO 34-1, B(b), as is known in the art.

Evaluation of Tubes 1-4 and Comparative Tubes 1-3 and 6-12:

Visual Appearance is determined through visual evaluation of the Tubes wherein inner and outer surfaces of the Tubes are circumferential and the Tubes have an 8 mm inner diameter and a 12 mm outer diameter. When a Tube is determined to be transparent (TP), the Tube can be visually seen through with the naked eye. When a Tube is determined to be translucent (TL), the Tube visually permits light to pass through but diffuses the light so as to prevent distinct images from being seen from within the Tube. When a Tube is determined to be opaque (OP), the Tube is visually impenetrable to light and does not allow light to pass through. When a Tube is determined to be white (W), the Tube visually appears as the color white, which is well known in the art.

The Mean Burst Pressures 1-5 are determined using two different types of the Tubes 1-4 and the Comparative Tubes 1-3 and 6-12. The tubes used to determine Burst Pressures 1 and 2 have an inner diameter of 8 mm and an outer diameter of 12 mm. The tubes used to determine Burst Pressures 3-5 have an inner diameter of 5.8 mm and an outer diameter of 8.2 mm. All determinations of Burst Pressures 1-5 are completed within seven days of manufacture of the Tubes. In addition, the Tubes used to determine Burst Pressure 4 are stored for 20 hours at 100° C. prior to testing.

The Mean Burst Pressures 1-5 are determined according to Festo-standard procedure 970 009 which is similar to DIN 53758 paragraph 5.1.3. The Tubes used to determine the Mean Burst Pressures 1-5 are 140 mm long and are first conditioned in an oven for 30 minutes with air circulation but without any additional internal pressure supplied. Then, the Tubes are tested. More specifically, the Tubes used to determine the Burst Pressures 1, 3, and 4 are conditioned and tested in an oven at a temperature of 25° C.±2° C. The Tubes used to determine the Burst Pressures 2 and 5 are conditioned and tested in an oven at a temperature of 70° C.±2° C. Each of the Tubes is pressurized at a rate of 2 bar/sec until it bursts. During testing, the constant primary pressure is 100 bar. Each Mean Burst Pressure 1-5 set forth in Table 5 above represents the Mean Burst Pressure calculated from three independent burst pressure determinations.

Kinking (i.e., Kinking at 4 cm Coil Diameter) is determined using a method well known in the coiled tube industry and art. This method utilizes samples of the Tubes having inner surfaces that are circumferential and that have 8 mm diameters and outer surfaces that are circumferential and that have 12 mm diameters. In this method, the Tubes are coiled in approximate circles of decreasing diameter until the Tubes kink. The method defines a kink as occurring when 10 percent of the outside diameter of the Tube is flattened. At this point, the diameter of the approximate circle is recorded. The data set forth above establishes that the Tubes 1-4 of the instant invention do not kink when coiled in an approximate circle having a diameter of approximately 4 cm.

Summary of Data:

The data set forth above illustrate that the Compositions of this invention exhibit desirable qualities of both TPUs (e.g. flexibility) and polyamides (e.g. high tensile strength). Thus, the Compositions of this invention can be used in applications where polyamides are not suitable for us, such as in sub-zero applications including food packaging films, ski boots, etc. The Compositions also exhibit different physical properties from typical TPUs such that the Compositions can be used in demanding applications such as road safety tools, railroad rails and insulators, etc.

The data set forth above also illustrate that the Tubes 1-4 of the instant invention generally have higher burst strengths (e.g. Mean Burst Pressure 4 in Table 5) than the Comparative Tubes 1-3, 6, and 7 of comparable hardness. Compared to the Comparative Tubes 8-12, the Tubes 1-4 of this invention resist kinking. Thus, the Tubes of this invention can be used in a variety of applications where light and compact tubes are desirable. In addition, the burst resistance of the Tubes provides for increased usefulness and desirability in a variety of applications where high performance tubing is preferred. Still further, the Tubes of this invention can be used in a variety of environments and formed in a cost effective manner. In addition, upon bending, the Tubes of this invention resist kinking, thus maximizing flow of fluids and maximizing applicability of the Tubes in an increasing number of applications.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A single layer tube having an inner surface that defines a path for conveying a flowable composition, said single layer tube consisting essentially of a mixture of:
   A. a thermoplastic polyurethane having a Shore Hardness of from 60D to 80D as determined using DIN EN ISO 1183-1; and
   B. polyamide 6/66 copolymer consisting of the reaction product of polyamide 6 and polyamide 66 monomers.

2. A single layer tube as set forth in claim 1 wherein said inner surface is in direct contact with the flowable composition and the flowable composition is further defined as a fluid.

3. A single layer tube as set forth in claim 1 wherein said mixture comprises equal parts by weight of said thermoplastic polyurethane and said polyamide 6/66 copolymer.

4. A single layer tube as set forth in claim 1 wherein said mixture comprises said thermoplastic polyurethane in an amount of greater than 50 parts by weight and said polyamide 6/66 copolymer in an amount of less than 50 parts by weight, per 100 parts by weight of said mixture.

5. A single layer tube as set forth in claim 1 wherein said mixture comprises said thermoplastic polyurethane in an amount of from 80 to 90 parts by weight and said polyamide 6/66 copolymer in an amount of from 10 to 20 parts by weight, per 100 parts by weight of said mixture.

6. A single layer tube as set forth in claim 1 wherein said mixture comprises said thermoplastic polyurethane in an amount of from 95 to 99 parts by weight and said polyamide 6/66 copolymer in an amount of from 1 to 5 parts by weight, per 100 parts by weight of said mixture.

7. A single layer tube as set forth in claim 1 wherein said mixture consists essentially of said thermoplastic polyurethane and said polyamide 6/66 copolymer and comprises less than 0.1 parts by weight of a compatibilizer per 100 parts by weight of mixture.

8. A single layer tube as set forth in claim 1 having an inner diameter of about 8 mm, an outer diameter of about 12 mm, and a burst strength of at least 50 bar as determined using DIN 5375A at 25° C.

9. A single layer tube as set forth in claim 8 that is tempered at 100° C. for 20 hours and has a burst strength of at least 60 bar as determined using DIN 5375A at 25° C.

10. A single layer tube as set forth in claim 1 wherein said Thermoplastic polyurethane has a Shore Hardness of from 60D to 65D as determined using DIN EN ISO 1183-1.

11. A single layer tube as set forth in claim 1 that is further defined as a single layer air-brake tube and wherein said thermoplastic polyurethane comprises the reaction product of an isocyanate and a polyether polyol and has a Shore Hardness of from 60D to 65D as determined using DIN EN ISO 1183-1.

12. A method of forming the single layer tube as set forth In claim 1, said method comprising the step of extruding the mixture of said thermoplastic polyurethane and the polyamide 6/66 copolymer to form the single layer tube.

13. A tube assembly comprising a single layer tube as set forth in claim 1 and a sheath disposed on said single layer tube and comprising a polymer that is the same or different than said thermoplastic polyurethane.

14. A tube assembly as set forth in claim 13 wherein said polymer is further defined as a second thermoplastic polyurethane that is different from the thermoplastic polyurethane and has a Shore Hardness of at least 36D as determined using DIN EN ISO 1183-1.

15. A method of forming the tube assembly as set forth in claim 13, Said method comprising the steps of:
   A. extruding the mixture of the thermoplastic polyurethane and the polyamide 6/66 copolymer to form the single layer tube; and
   B. disposing the sheath on the single layer tube.

16. A single layer tube as set forth in claim 1 wherein Said thermoplastic polyurethane has a Shore Hardness of from 60D to 74D as determined using DIN EN ISO 1183-1.

17. A single layer air-brake tube having an inner surface that defines a path for conveying a flowable composition, said single layer air-brake tube consisting essentially of a mixture of:
   A. a thermoplastic polyurethane having a Shore Hardness of from 60D to 80D as determined using DIN EN ISO 1183-1; and
   B. polyamide 6/66 copolymer consisting of the reaction product of polyamide 6 and polyamide 66 monomers,
   wherein said single layer air-brake tube has burst strength of at least 50 bar as determined using DIN 5375A at 25° C.

18. A single layer air-brake tube as set forth in claim 17 wherein said thermoplastic polyurethane has a Shore Hardness of from 60D to 74D as determined using DIN EN ISO 1183-1.

19. A single layer air-brake tube as set forth in claim 17 wherein said thermoplastic polyurethane has a Shore Hardness of from 60D to 65D as determined using DIN EN ISO 1183-1.

* * * * *